US006842826B1

(12) United States Patent
McNutt

(10) Patent No.: US 6,842,826 B1
(45) Date of Patent: Jan. 11, 2005

(54) METHOD AND APPARATUS FOR PROVIDING EFFICIENT MANAGEMENT OF LEAST RECENTLY USED (LRU) ALGORITHM INSERTION POINTS CORRESPONDING TO DEFINED TIMES-IN-CACHE

(75) Inventor: Bruce McNutt, Gilroy, CA (US)

(73) Assignee: International Business Machines Incorporated, Armonk, NY (US)

( * ) Notice: Subject to any disclaimer, the term of this patent is extended or adjusted under 35 U.S.C. 154(b) by 659 days.

(21) Appl. No.: 09/588,955

(22) Filed: Jun. 7, 2000

(51) Int. Cl.[7] .............................................. G06F 12/12
(52) U.S. Cl. ...................................... 711/136; 711/160
(58) Field of Search ................................ 711/136, 110, 711/150, 160, 133, 134

(56) References Cited

U.S. PATENT DOCUMENTS

| 4,008,460 | A |   | 2/1977  | Bryant et al. |
|-----------|---|---|---------|---------------|
| 4,437,155 | A |   | 3/1984  | Sawyer et al. |
| 4,467,411 | A |   | 8/1984  | Fry et al. |
| 4,490,782 | A | * | 12/1984 | Dixon et al. ................ 711/136 |
| 5,619,675 | A |   | 4/1997  | De Martine et al. |
| 5,706,467 | A |   | 1/1998  | Vishlitzky et al. |
| 5,751,993 | A |   | 5/1998  | Ofek et al. |
| 5,761,717 | A |   | 6/1998  | Vishlitzky et al. |
| 5,787,473 | A |   | 7/1998  | Vishlitzky et al. |
| 6,145,061 | A | * | 11/2000 | Garcia et al. ............... 711/154 |
| 6,490,666 | B1| * | 12/2002 | Cabrera et al. ............. 711/161 |

OTHER PUBLICATIONS

"A Sticky Bit Buffer," IBM Technical Disclosure Bulletin, Mar. 1991, 1 pg.
"Extended L2 Directory for L1 Residence Record," IBM Technical Disclosure Bulletin, Jan. 1992, 2 pp.
"Use of Secondary Address Stack and Multiple Insertion Points for Database Buffer Management Under Least Recently Used Policy," IBM Technical Disclosure Bulletin, Jul. 1993, 2 pp.

* cited by examiner

Primary Examiner—Matthew D. Anderson
(74) Attorney, Agent, or Firm—Crawford Maunu PLLC

(57) ABSTRACT

A method and apparatus for providing efficient management of LRU insertion points corresponding to defined times-in-cache is disclosed. Insertion points are implemented as "dummy entries" in the LRU list. As such, they undergo the standard process for aging out of cache, along with all other entries. A circular queue of insertion points is maintained. At regular intervals, a new insertion point is placed at the top of the LRU list, and at the tail of the queue. When an insertion point reaches the bottom of the LRU list ("ages out"), it is removed form the head of the queue. Since insertion points are added to the list at regular intervals, the remaining time for data at the corresponding LRU list positions to age out must increase in the same, regular steps, as we consider insertion points from the bottom to the top of the LRU list. Therefore, we can find an insertion point which exhibits any desired age-out time, by indexing into the circular queue.

18 Claims, 5 Drawing Sheets

| IP-X → | # | Address | Data Set | P | N |
|---|---|---|---|---|---|
| | 1 | XXXXXXXXXXXX | X | XX | XX |
| | 2 | XXXXXXXXXXXX | X | XX | XX |
| IP-Y → | 3 | XXXXXXXXXXXX | X | XX | XX |
| | 4 | XXXXXXXXXXXX | Y | XX | XX |
| | 5 | XXXXXXXXXXXX | Y | XX | XX |
| IP-Z → | 6 | XXXXXXXXXXXX | Y | XX | XX |
| | 7 | XXXXXXXXXXXX | Z | XX | XX |
| | 8 | XXXXXXXXXXXX | Z | XX | XX |
| | 9 | XXXXXXXXXXXX | X | XX | XX |
| | 10 | XXXXXXXXXXXX | Y | XX | XX |
| | 11 | XXXXXXXXXXXX | Z | XX | XX |
| | 12 | XXXXXXXXXXXX | Y | XX | XX |

*Fig. 4*

METHOD AND APPARATUS FOR PROVIDING EFFICIENT MANAGEMENT OF LEAST RECENTLY USED (LRU) ALGORITHM INSERTION POINTS CORRESPONDING TO DEFINED TIMES-IN-CACHE

BACKGROUND OF THE INVENTION

1. Field of the Invention

This invention relates in general to a cache in a data processing system, and more particularly to a method and apparatus for providing efficient management of LRU insertion points corresponding to defined times-in-cache.

2. Description of Related Art

A computer system typically includes an information processor coupled to a hierarchical stage stored system. The hardware can dynamically allocate parts of memory within the hierarchy for addresses deemed most likely to be accessed soon. The type of storage employed in each staging location relative to the processor is normally determined by balancing requirements for speed, capacity, and costs. Computer processes continually refer to this storage over their executing lifetimes, both reading from and writing to the staged stored system. These references include self-referencing as well as references to every type of other process, overlay or data. It is well-known in the art that data storage devices using high-speed random access memories (RAM) can be referenced orders of magnitude faster than high volume direct-access storage devices (DASD's) using rotating magnetic media. Such electronic RAM storage relies upon high-speed transfer of electrical charges over small distances, while DASD's typically operate mechanically by rotating a data storage position on a magnetic disk with respect to read-write heads. The relative cost of a bit of storage for DASD and RAM makes it necessary to use DASD for bulk storage and electronic RAM for processor internal memory and caching.

A commonly employed memory hierarchy includes a special, high-speed memory known as cache that increases the apparent access times of the slower memories by holding the words that the CPU is most likely to access. For example, a computer may use a cache memory that resides between the external devices and main memory, called a disk cache, or between main memory and the CPU, called a CPU cache.

The transfer of operands or instructions between main store and CPU cache, or bulk storage and the disk cache is usually effected in fixed-length units called blocks. A block of data may be transferred in varying sizes such as tracks, sectors, lines, bytes, etc., as are known in the art. When accessing of the disk allows retrieval of necessary data from the cache, such success is called a "hit", and when retrieval of necessary data cannot be performed in the cache, such failure is called a "miss".

A high-speed CPU cache enables relatively fast access to a subset of data instructions which were previously transferred from main storage to the cache, and thus improves the speed of operation of the data processing system. Cache memory may also be used to store recently accessed blocks from secondary storage media such as disks. This cache memory could be processor buffers contained in main memory or a separate disk cache memory located between secondary and main storage.

A disk cache is a memory device using a semiconductor RAM or SRAM and is designed to eliminate an access gap between a high-speed main memory and low-speed large-capacity secondary memories such as magnetic disk units. The disk cache is typically in a magnetic disk controller arranged between the main memory and a magnetic disk unit, and serves as a data buffer.

The principle of a disk cache is the same as that of a central processing unit (CPU) cache. When the CPU accesses data on disk, the necessary blocks are transferred from the disk to the main memory. At the same time, they are written to the disk cache. If the CPU subsequently accesses the same blocks, they are transferred from the disk cache and not from the disk, resulting in substantially faster accesses.

Since the disk cache capacity is smaller than that of the disk drive, not all data blocks that may be required by the CPU are always stored in the disk cache. In order for a new block to be loaded when the disk cache is full, blocks must be removed from the cache to make room for newly accessed data.

To enable retrieval of information from the cache, a list of entries associated with the cache is maintained in a directory which is an image of the cache. Each block residing in the cache has its tag or address, as well as other useful information, stored in an entry in the directory. Once the cache has been filled with data blocks, a new data block can only be stored in the cache if an old block is deleted or overwritten. Certain procedures are necessary to select blocks as candidates for replacement, and to update the directory after a change of the cache contents.

A well known and commonly used disk cache replacement algorithm is a Least Recently Used (LRU) algorithm. According to the LRU algorithm, the block which has stayed in the cache for the longest period is selected as the least necessary block. If a cache hit occurs as a result of the directory search, the entry in the cache directory corresponding to the "hit" cache block is set to the Most Recently Used (MRU) position in the list of cache entries maintained by the directory. If a miss occurs in a disk cache having no empty space, the cache memory must be assigned for new staging, so the least necessary data is removed to obtain an empty space. In the case of a cache miss, the LRU entry in the list, which would be in the bottom position of the list in a linked LRU list, is deleted from the list and a new entry is generated in the MRU position, the new entry corresponding to the block loaded into the cache as a result of the cache miss.

Although the LRU scheme performs well and is widely accepted, it has limitations. To effectively control the use of memory, it is necessary to distinguish among the various individual groups or types of data that may attempt to use the data cache. For example, in the extreme case, the cache may be "flushed" by a rapid succession of misses to data that has no locality. In this case, new data that does not benefit from the use of cache memory replaces older data which may have profited from the cache storage. Such a situation can arise under an LRU scheme and it tends to limit the effectiveness of the cache in cases where poor locality is present, especially if the cache size is small.

Since contention for memory and staging path resources can interfere with the effectiveness of the cache, cache controllers must manage these resources so as to mitigate the effects of contention. This is accomplished in some prior art by deciding, for each defined group of data which reaches the cache, whether this group will be allowed to use the cache memory. The groups of data as used in the prior art and as are used in the present invention are called "data sets" and are merely any logical grouping of data which facilitates memory allocation. As examples, data sets can be defined in terms of files of application data, ranges of device cylinders, a number of tracks, sectors, or lines, groups of data utilized by a single file or application, or by a functional distinction between groups, such as between instructions and data.

In some prior art storage controllers, data sets which are benefiting from use of the cache are allowed access to the memory cache, and data sets which are not benefiting from the cache are not staged. However, in realistic environments, there is a wide range in cache locality behavior even in groups of data which benefit from using the cache. This makes it highly desirable to control, not just whether a specific group of data will be permitted to use the cache memory, but how much cache memory that group will be permitted to use. In this way, larger amounts of memory can be provided to support those data sets which most benefit from the extra cache storage.

Various techniques have been proposed to accomplish this type of memory control, but their complexity make them impractical to implement. These techniques control the cache memory by partitioning it, so that each group of data is assigned the use of a particular partition. The partitions may be permanent, in which case complex analysis is required in advance in order to set the partition sizes, or the partition sizes are dynamically controlled, in which case complex statistical data gathering and boundary-adjustment algorithms are required.

One solution to the above-described problems calls for the use of insertion points into a cache LRU list. U.S. Pat. No. 5,606,688, issued Feb. 25, 1997, to McNutt et al., and assigned to International Business Machines Corporation, calls for the use of insertion points into a cache LRU list, so as to cause data inserted at these points to experience specified single-reference residency times.

According to The U.S. Pat. No. 5,606,688, the memory allocation technique for the cache controller dynamically adjusts the amount of cache memory a particular data set will be permitted use, but the memory is not partitioned and associated complex statistical data gathering and boundary-adjustment calculations are not required. However, the solution provided by U.S. Pat. No. 5,606,688 requires significant overhead processing. In addition, the insertion points have a fixed position and requires many pointers associated with the insertion points that must be updated after each insertion.

It can be seen then that there is a need for a method and apparatus for providing efficient management of LRU insertion points corresponding to defined times-in-cache.

It can also be seen that there is a need for a method and apparatus that provides a large number of insertion points without additional significant housekeeping and wherein the insertion points are based upon time ratios rather than positions.

SUMMARY OF THE INVENTION

To overcome the limitations in the prior art described above, and to overcome other limitations that will become apparent upon reading and understanding the present specification, the present invention discloses a method and apparatus for providing efficient management of LRU insertion points corresponding to defined times-in-cache.

The present invention solves the above-described problems by implementing insertion points as "dummy entries" in the LRU list. As such, they undergo the standard process for aging out of cache, along with all other entries.

A method in accordance with the principles of the present invention includes maintaining data blocks in a queue having a tail and a head end corresponding to a list of entries in a cache directory list, the list having a top position and a bottom position, wherein each entry includes fields for storing information including a designation of one of a plurality of data sets to which the corresponding data block belongs, periodically adding an insertion point at the top position of the list and at the tail of the queue, and removing an aged insertion point from the bottom position of the list and from the head of the queue, aging the entries and the insertion points in the queue and the list according to a standard process for aging data blocks out of the lines, identifying with each data block a position on the queue, inserting an entry corresponding to the data block in the list of entries at the insertion point associated with the identified queue position.

Other embodiments of a method in accordance with the principles of the invention may include alternative or optional additional aspects. One such aspect of the present invention is that the queue is a circular queue.

Another aspect of the present invention is that data blocks are aged out of the queue in the same, regular steps as the corresponding data at the corresponding list positions is aged out.

Another aspect of the present invention is that insertion points of the list are indexed to insertion points of the queue.

Another aspect of the present invention is that the indexing of insertion points of the list to insertion points of the queue allows a location of a data block to be identified.

Another aspect of the present invention is that for a given data set a desired single reference residency time associated with an insertion point is selected based upon the maximum time available, the priority of the data, and the sensitivity of the data to residency time.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 4 is a logical depiction of a cache list having intermediate insertion points, in accordance with a preferred embodiment of the present invention.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention implements insertion points as "dummy entries" in the LRU list. As such, they undergo the standard process for aging out of cache, along with all other entries. A circular queue of insertion points is maintained. At regular intervals, a new insertion point is placed at the top of the LRU list, and at the tail of the queue. When an insertion point reaches the bottom of the LRU list ("ages out"), it is removed form the head of the queue. Since insertion points are added to the list at regular intervals, the remaining time for data at the corresponding LRU list positions to age out must increase in the same, regular steps, as we consider insertion points from the bottom to the top of the LRU list. Therefore, we can find an insertion point which exhibits any desired age-out time, by indexing into the circular queue.

Figure 1:
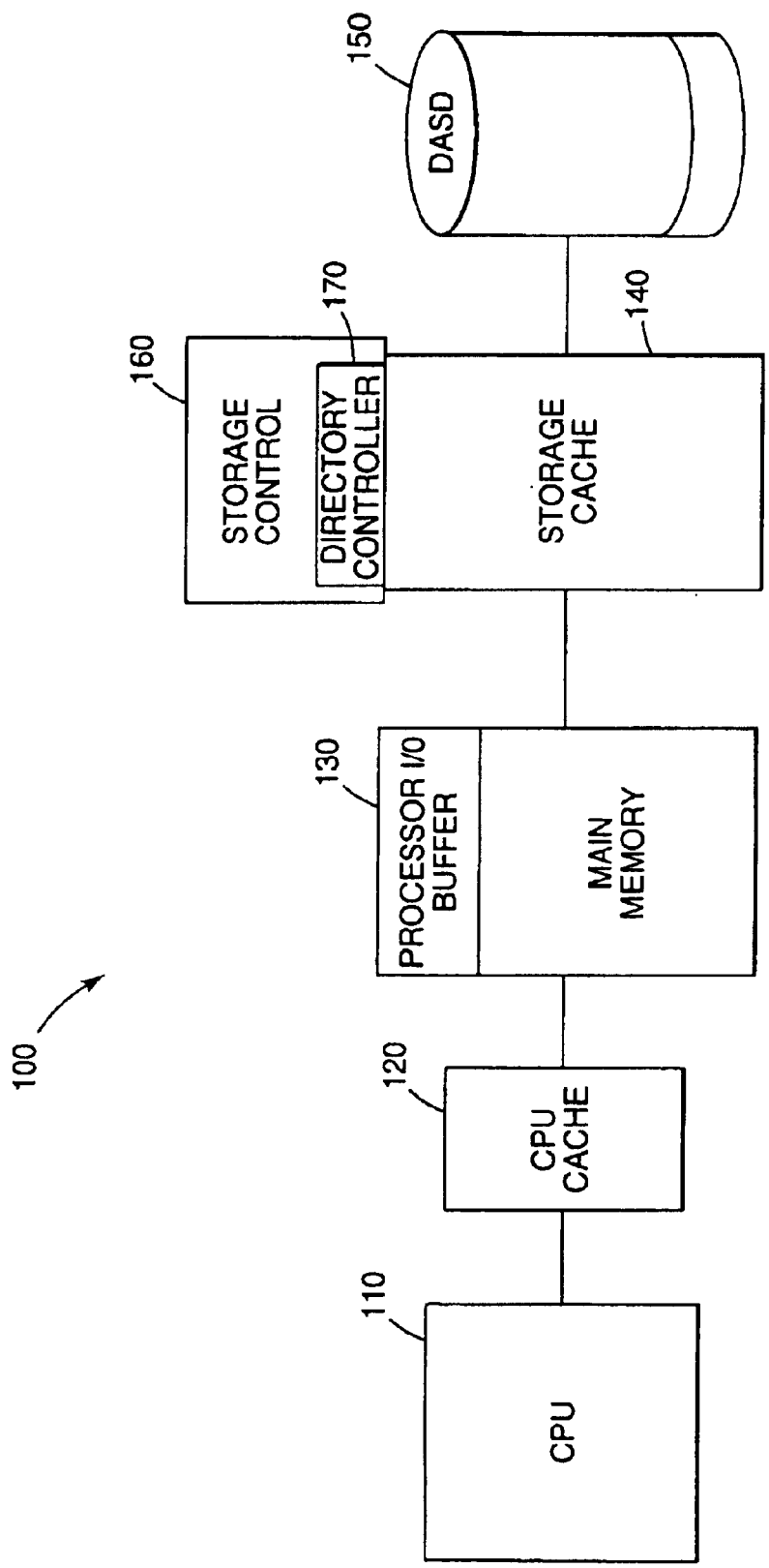
FIG. 1 illustrates a block diagram of a staged hierarchical memory system within a data processing system.

FIG. 1 illustrates a block diagram 100 of the memory hierarchy of storage devices within a computer system. CPU 110 is at the top of the hierarchy with a few low-capacity high-speed registers. High-speed CPU cache 120 is a special buffer storage, smaller and faster than main storage, that is used to hold a copy of instructions and data in main storage that are likely to be needed again next by the processor and that have been obtained automatically from main storage.

Main memory 130 is a program-addressable storage from which instructions and other data can be loaded directly into other registers for subsequent execution or processing. Programs which are being processed by CPU 110 are run out of main memory 130. When required by a specific program, data is transferred from disk storage into main memory for processing. The Processor I/O Buffer may also reside in main memory, providing a cache to contain data previously obtained from disk storage.

Storage cache 140, 160, also referred to as a disk cache, performs an analogous function to the processor I/O buffer but is located in the storage control. Storage cache memory has a much higher capacity than a standard high-speed processor cache (typically 30–4,096 Megabytes), and caches tracks of data which have been accessed from DASD 150 by CPU 110. Cache memory 140 is maintained and controlled by storage control 160. Storage control 160 controls the I/O of the tracks held by the storage cache. Additionally, storage control 160 performs memory allocation and adaptive cache management by adapting the cache I/O dynamically as the workload for the computer system changes.

According to the present invention, a disk cache or storage cache, such as that shown in FIG. 1, may be used to implement the present invention. However, the present invention is equally applicable to the operation of a processor I/O buffer. A disk cache 140 has a cache memory for storing data blocks of bulk storage. Each data block belongs to a data set such as a range of device cylinders. A directory controller 170 maintains a cache directory having a list of entries associated with data blocks stored in the cache memory in association with the storage controller 160.

Figure 2A:
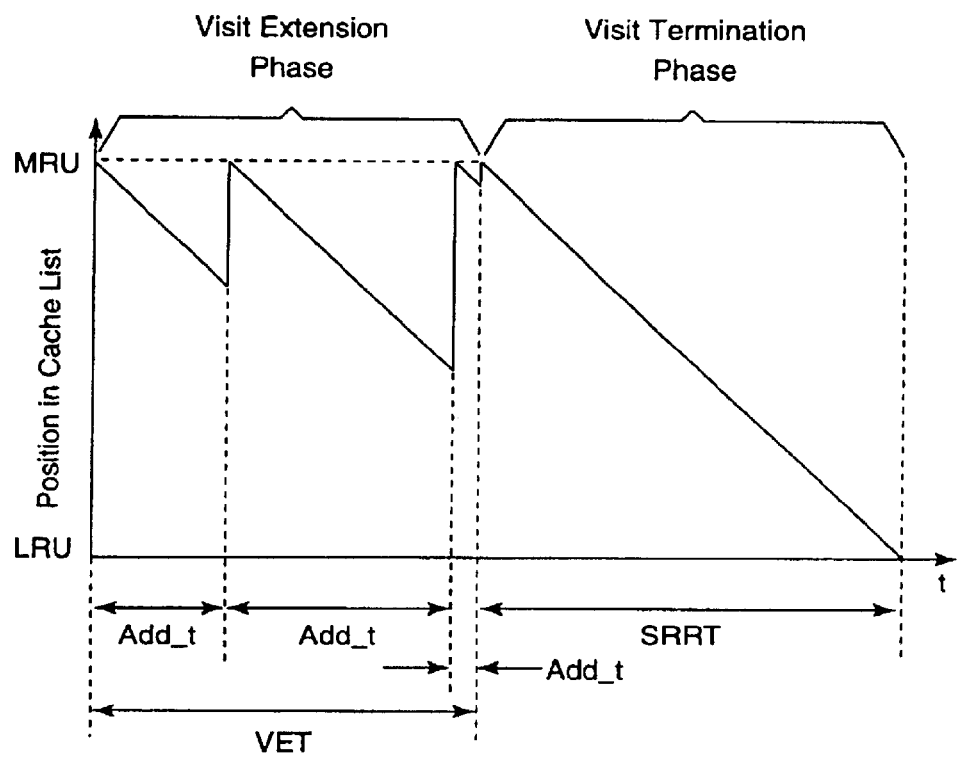
FIG. 2A is a graph showing an example of the position of a data block entry in a cache list over time.
Figure 2B:
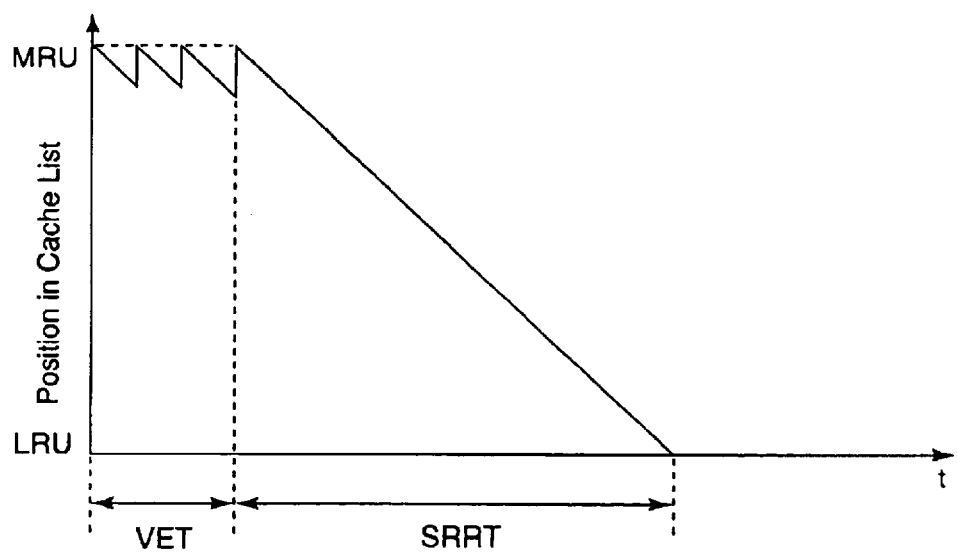
FIG. 2B is a graph showing an example of the position of a data block entry in a cache list over time.

To facilitate the description of the present invention, consider the operation of a prior art storage cache using an LRU cache management scheme. Referring to FIGS. 2A–2B, two examples of two different data blocks residing in a cache following the LRU scheme are graphed showing their position in a cache list over time.

Storage controllers maintain a list of entries in the cache. In prior art controllers, this list would be maintained in LRU order. The most recently used item appears at the top of the list, and the least recently used item is at the bottom. When a new item must be added to the list, the storage occupied by the item at the bottom of the list is overwritten by the new item. Input and output into the cache would be controlled by reference to the position of entries in the list. When a data block is loaded into a LRU cache, its entry is placed in the list at the most-recentlyused (MRU) position in the list, and the LRU entry in the list is removed.

In the first example of FIG. 2A, a first data block, belonging to a particular data set, is initially the subject of a miss. The miss results in the data block being loaded into the cache and an entry corresponding to that data block being inserted into the list at the MRU position (at time=0). As time progresses, the cache will continue to receive misses for other data blocks at a fairly regular rate, which will push the first entry to lower positions in the list as newer entries are placed above it at the MRU.

It should be noted that although the graphs described here and below show entries being pushed down the list at a constant rate, the randomness of hits to misses in a cache over time may not have such a uniformly linear rate of descent within the list. However, to facilitate the description, a constant rate has been shown in all graphs.

If the data block is referenced by the CPU while it is still residing in the cache, the data block would be output to the requesting processor and its corresponding entry in the list would be returned to the MRU position. This can be seen in the example of FIG. 2A, where, after the entry was initially loaded into the list subsequent to a miss of that data block, the data block was referenced three more times during its residency in the cache. Each time the data block was referenced, its entry was returned to the MRU position.

In FIG. 2B, there is depicted a graph of the position in the cache list versus time for a data block belonging to a different data set than the data block in the first example. In this second example, the data block received the same number of hits as the data block in the first example, but in a much shorter period of time.

FIG. 4 shows an example of a cache directory. The cache directory list includes a number of entries equal to the capacity of the cache (measured in the cache atomic unit of transfer) and is comprised of numerous bytes of binary metadata. For illustrative purposes, the list of entries shown in FIG. 4 contains 12 entries, wherein a realistic list may have 256K or more entries. The list is configured by ordering the linked entries sequentially from a top position, at position 1, to a bottom position, at position 12.

Each entry represents a data block in the cache memory and contains the address (or address tag) of the corresponding data block, an identifier of the data set to which the data block belongs, a "Previous" pointer, and a "Next" pointer. The pointers are necessary because the list is a linked list, as is known in the art, and although the entries are represented logically in a list as shown in FIG. 4, the entries are physically ordered in a memory module however its space allows, which may not necessarily be the logical order of the list. Therefore, each entry contains a pointer to the next entry in the list and a pointer to the previous entry in the list, in order to maintain the logical order of the list.

According to U.S. Pat. No. 5,606,688, as discussed above, the storage control for the cache generates a new entry when a data block is loaded into the cache. This new entry contains the address of the newly loaded data block and indicates the data set to which that data block belongs. The generated entry is inserted into the list at a calculated insertion point for that block's data set. Because the entry is inserted into the list, it is added to the list between two other entries, unless the insertion point is at the top or bottom of the list. The Previous and Next pointers of the inserted entry are set to point to the entries above and below the insertion point, respectively. Also, the pointers of these two entries are also revised to link with the inserted entry.

When the cache memory is filled with data, the storage control will overwrite data blocks contained in the cache memory as new data blocks are loaded into the cache as a result of misses. The storage controller will select the data block represented by the bottom entry in the list as the block to be replaced by the newly loaded block. Also, when the new entry is inserted into the list, the bottom entry, entry 12, is deleted from the list. Thereafter, for as long as the cache is full, a new block loaded into the cache will replace the data block listed in the bottom entry of the list, and the bottom entry is deleted from the list when the new entry is inserted.

When the CPU references a data block residing in the disk cache, the list entry corresponding to that referenced data block is moved to the insertion point for that block's data set. For an example, as shown in FIG. 4, if the entry at position 10, which belongs to data set Y, was referenced, it would be moved up to the insertion point for data set Y at IP-Y, between positions 3 and 4. If the entry at position 9 were referenced, it would be moved to the insertion point for data set X which is IPX, above position 1. If the entry at position 7 was referenced, it would remain at position 7 because it is at the insertion point for data set Z. Because no new data blocks are loaded when the cache receives a hit, no data blocks are overwritten and the bottom entry is not removed.

According to U.S. Pat. No. 5,606,688, the time that any particular entry remains in the list can be broken into two phases. The first phase is the Visit Termination Phase and the second phase is the Visit Extension Phase. Each visit of a track to the cache ends with the Visit Termination Phase, in which the entry of the list corresponding to that track migrates from its insertion point to the bottom of the list and is then replaced. This phase occurs after the data block receives its last reference during the current residency in the cache.

The time required for the data block to remain in the Visit Termination Phase is called the single-reference residency time (SRRT), since it is equivalent to the time spent in the cache by a track that is referred to exactly once. Thus, the SRRT is the time it takes the entry to move from its insertion point in the list, wherever that may be, to the bottom of the list and drop off. As seen in FIG. 2A, the Visit Termination Phase, for this example, occurs after the fourth reference to the data block. Here, the single-reference residency time is the time it takes the entry to move from the MRU to the LRU and then drop off the list.

Prior to the Visit Termination Phase, there are zero or more cases in which hits to the track or block cause the data block to be put at the top, or at an intermediate insertion point, of the cache list. Each such event causes the length of the data block's visit to the cache to be increased by the amount of time the block has been resided in the cache between this and the previous reference. Let this amount of time be called Add_t, and let the sum of all Add_t for a single visit be called the Visit Extension Time (VET). The period during which the Visit Extension Time occurs is called the Visit Extension Phase. The three Add_t time periods and the VET which occurred in the Visit Extension Phase for the first example are labeled in the graph of FIG. 2A.

From the standpoint of obtaining hits, the memory use in the Visit Termination Phase is wasted. Only the memory used in the Visit Extension Phase contributes directly to obtaining hits. Memory used in the Visit Termination Phase cannot be totally eliminated, however, because it is not possible to determine in advance whether a track contained by the cache is in the Visit Termination Phase or the Visit Extension Phase.

According to U.S. Pat. No. 5,606,688, a determination is made for each data set as to the longest Visit Extension Phase which needs to be supported for effective cache use for that data set. The single-reference residency time of the data set is then adjusted so as to approximate this maximum duration. The single-reference residency time of a particular data set is dynamically adjusted by changing the point at which tracks belonging to that data set are inserted into the cache list; thereby, controlling the distance, and consequently the time, it takes the data block to reach the bottom of the list and be removed.

Figure 3A:
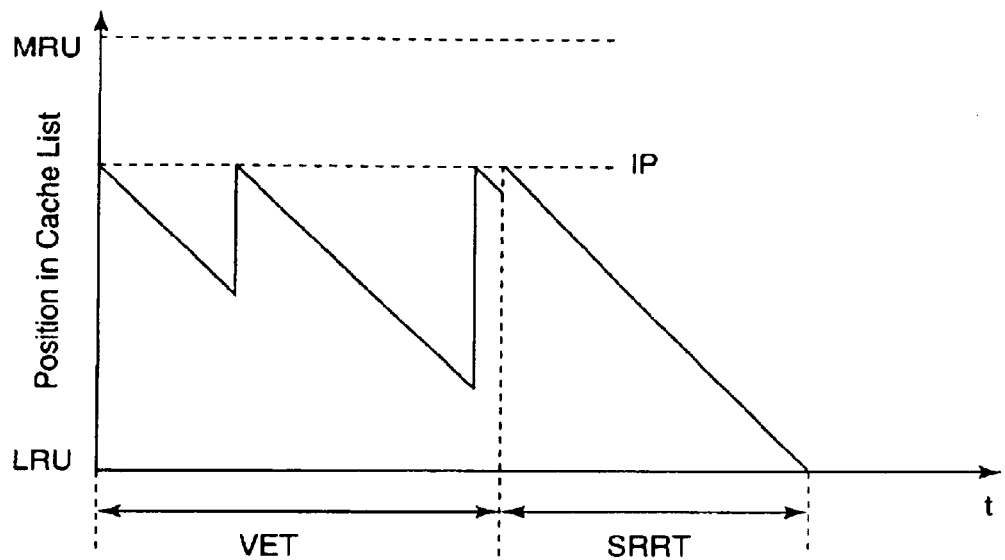
FIG. 3A is a graph showing an example of the position of a data block entry in a cache list over time, in accordance with a preferred embodiment of the present invention.

For data sets which appear to benefit from a Visit Extension Phase as long as possible given the available memory, data blocks are placed at the top of the list or at a high intermediate position in the list. For example, if FIG. 2A was characteristic of an average visit in the cache by blocks belonging to a particular data set, this data set would benefit from a long visit to the cache because of its relatively long Visit Extension Time (VET). Therefore, according to U.S. Pat. No. 5,606,688, data blocks from this data set would be inserted into the list at an Insertion Point (IP) which is relatively high in the list, so that it may utilize its entire VET. The resulting graph would look like FIG. 3A, for example.

Figure 3B:
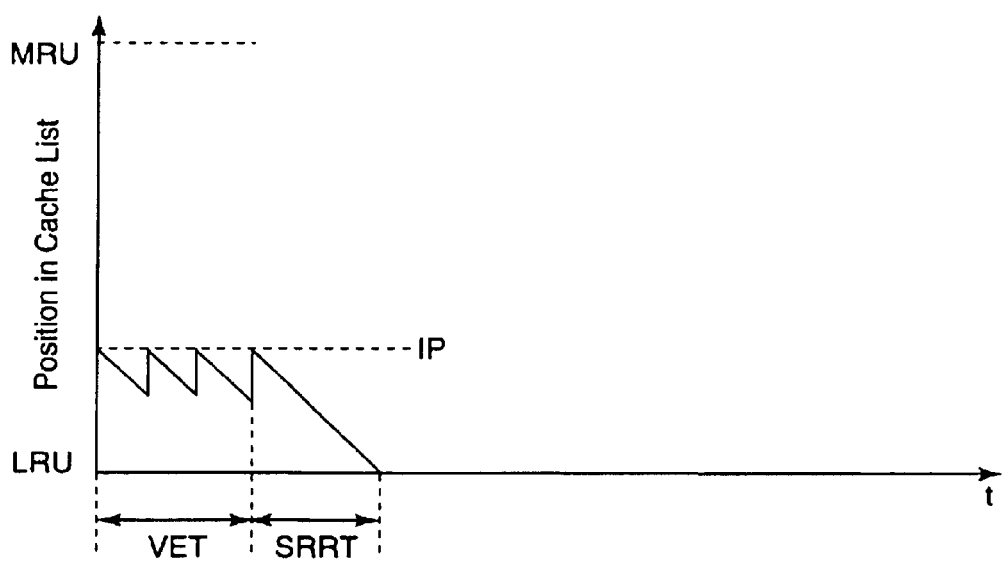
FIG. 3B is a graph showing an example of the position of a data block entry in a cache list over time, in accordance with a preferred embodiment of the present invention.

For data sets which appear to only benefit from a short Visit Extension Phase, their data blocks are inserted in a lower position in the cache list so that they will quickly expire from the cache, but only after their useful time in the cache—in other words, the Visit Extension Phase—has expired. For example, if the graph in FIG. 2B represented the average Visit Extension Phase of a particular data set, its data block entries could be placed much lower on the list than the data set shown in FIG. 2A because its useful time is much shorter. As seen in FIG. 3B, entries for this data set are inserted in the list at an IP lower than that of the data set represented in FIG. 3A. In both cases, the IP is chosen so that it is unlikely that a particular data block in that data set will expire during the Visit Extension Phase by reaching the bottom of the list, and yet will quickly expire in the shortest possible SRRT once the extension phase is over.

Therefore, the cache controller according to U.S. Pat. No. 5,606,688 dynamically controls the levels of cache memory used by individual groups of data sharing a cache by monitoring the Visit Extension Time of each group of data and controlling the corresponding insertion point for data in the group to minimize an individual data block's residency time in the cache, without limiting the Visit Extension Time during which that data block is useful to the CPU.

The calculations of the insertion point for each data set are continually performed in order to allow dynamic memory allocation which will follow the changes in memory usage by the various data sets. However, the solution provided by U.S. Pat. No. 5,606,688 requires significant overhead processing. In addition, the insertion points have a fixed position and require many pointers associated with the insertion points that must be updated after each insertion.

Figure 5:
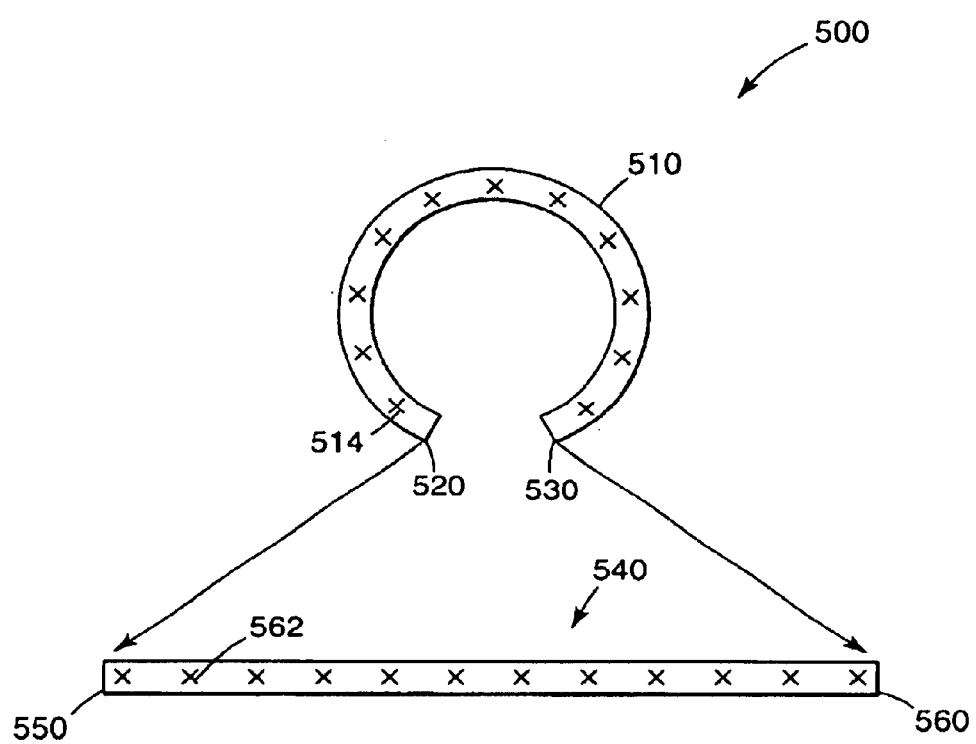
FIG. 5 illustrates a system for providing efficient management of LRU insertion points corresponding to defined times-in-cache according to the present invention.

FIG. 5 illustrates a system 500 for providing efficient management of LRU insertion points corresponding to defined times-in-cache according to the present invention. In FIG. 5, a circular queue 510 is provided having a tail 520 and a head 530. FIG. 5 also shows an LRU list 540 having a top 550 and a bottom 560. Insertion points 562 are provided in the LRU list 540 as "dummy entries", and as such, the insertion points 562 undergo the standard process for aging out of cache, along with all other entries. At regular intervals, a new insertion point 564/514 is placed at the top 550 of the LRU list 540, and at the tail 520 of the circular queue 510. When an insertion point 562 reaches the bottom 560 of the LRU list 540 ("ages out"), the associated insertion point 514 is removed form the head 530 of the circular queue 510.

Since insertion points 562 are added to the LRU list 540 at regular intervals, the remaining time for data at the corresponding LRU list positions to age out must increase in the same, regular steps. Therefore, an insertion point 562 may be located which exhibits any desired age-out time, by indexing into the circular queue 510. For a given data set or identified collection of data, a desired single reference residency time associated with an insertion point 562/514 is selected based upon the maximum time available, the priority of the data, and the sensitivity of the data to residency time. Thus, for each data block, a position in the queue is located. An entry corresponding to the data block is inserted in the list of entries at the insertion point associated with the identified queue position.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of dynamic cache memory allocation comprising:

maintaining a list of entries in a cache directory list corresponding to data blocks in a queue having a tail and a head end, the list having a top position and a bottom position, wherein each entry includes fields for storing information including a designation of one of a plurality of data sets to which the corresponding data block belongs;

periodically adding an insertion point at the top position of the list and at the tail of the queue, and deleting an aged insertion point from the bottom position of the list and from the head of the queue;

aging the entries and the insertion points in the queue and the list according to a standard process for aging data blocks out of the queue;

loading a data block into the queue at a predetermined insertion point; and in response to the loading of the data block into the queue, inserting an entry corresponding to the data block in the list of entries at the insertion point corresponding to the queue insertion point.

2. The method of claim 1 wherein the queue is a circular queue.

3. The method of claim 1 wherein data at the corresponding list positions is aged out in the same, standard process as the corresponding data block is aged out of the queue.

4. The method of claim 1 wherein insertion points of the list are indexed to insertion points of the queue.

5. The method of claim 4 wherein the indexing of insertion points of the list to insertion points of the queue allows a location of a data block to be identified.

6. The method of claim 1 wherein for a given data set a desired single reference residency time associated with an insertion point is selected based upon the maximum time available, the priority of the data, and the sensitivity of the data to residency time.

7. A cache within a staged hierarchical memory system of a data processing system, the cache comprising:

a cache memory for storing a plurality of data blocks in a queue, each block belonging to one of a plurality of data sets;

a cache directory having a list of entries associated with data blocks stored in the cache memory, wherein the list is configured as an ordered list having a top position to a bottom position, and further wherein each entry corresponds to an individual data block and has fields for storing information including a designation of the data set to which the corresponding data block belongs;

a directory controller which generates an entry corresponding to a data block of a given data set when the data block is loaded in the cache, the directory controller inserts the generated entry into the list at an insertion point for the given data set corresponding to a calculated optimal single-reference residency time for the given data set, and deletes the bottom entry from the list, which is at the bottom position of the list, when an entry is inserted in the list, and further wherein the directory controller moves an entry in the list to an insertion point for the given data set of a corresponding data block when the corresponding data block is referenced in the cache, the directory controller periodically adding an insertion point at the top position of the list and at the tail of the queue, and deleting an aged insertion point from the bottom position of the list and from the head of the queue and aging the entries and the insertion points in the queue and the list according to a standard process for aging data blocks out of the queue; and a storage control unit for storing data blocks within the cache memory, which replaces the data block corresponding to the bottom entry with the data block corresponding to the entry inserted into the list.

8. The cache of claim 7 wherein the cache memory comprises a circular queue.

9. The cache of claim 7 wherein directory controller ages data at the corresponding list positions in the same, standard process as the corresponding data block is aged out of the queue.

10. The cache of claim 7 wherein the directory controller indexes insertion points of the list to insertion points of the queue.

11. The cache of claim 10 wherein the directory controller uses the index of insertion points of the list to insertion points of the queue to locate data blocks.

12. The cache of claim 7 wherein for a given data set the directory controller selects a desired single reference residency time associated with an insertion point based upon the maximum time available, the priority of the data, and the sensitivity of the data to residency time.

13. A data processing system comprising:

a staged hierarchical memory system including a cache memory for storing a plurality of data blocks in a queue, each block belonging to one of a plurality of data sets; a cache directory having a list of entries associated with data blocks stored in the cache memory, wherein the list is configured as an ordered list having a top position to a bottom position, and further wherein each entry corresponds to an individual data block and has fields for storing information including a designation of the data set to which the corresponding data block belongs;

a directory controller which generates an entry corresponding to a data block of a given data set when the data block is loaded in the cache, the directory controller inserts the generated entry into the list at an insertion point for the given data set corresponding to a calculated optimal single-reference residency time for the given data set, and deletes the bottom entry from the list, which is at the bottom position of the list, when an entry is inserted in the list, and further wherein the directory controller moves an entry in the list to an insertion point for the given data set of a corresponding data block when the corresponding data block is referenced in the cache, the directory controller periodically adding an insertion point at the top position of the list and at the tail of the queue, and deleting an aged insertion point from the bottom position of the list and from the head of the queue and aging the entries and the insertion points in the queue and the list according to a standard process for aging data blocks out of the queue; and a storage control unit for storing data blocks within the cache memory, which replaces the data block corresponding to the bottom entry with the data block corresponding to the entry inserted into the list.

14. The data processing system of claim 13 wherein the cache memory comprises a circular queue.

15. The data processing system of claim 13 wherein directory controller ages data at the corresponding list positions in the same, standard process as the corresponding data block is aged out of the queue.

16. The data processing system of claim 13 wherein the directory controller indexes insertion points of the list to insertion points of the queue.

17. The data processing system of claim 16 wherein the directory controller uses the index of insertion points of the list to insertion points of the queue to locate data blocks.

18. The data processing system of claim 13 wherein for a given data set the directory controller selects a desired single reference residency time associated with an insertion point based upon the maximum time available, the priority of the data, and the sensitivity of the data to residency time.

* * * * *

UNITED STATES PATENT AND TRADEMARK OFFICE
CERTIFICATE OF CORRECTION

PATENT NO. : 6,842,826 B1
DATED : January 11, 2005
INVENTOR(S) : McNutt

It is certified that error appears in the above-identified patent and that said Letters Patent is hereby corrected as shown below:

Column 6,
Line 14, "most-recentlyused" should read -- most-recently-used --.

Column 7,
Line 34, "IPX" should read -- IP-X --.

Signed and Sealed this

Eighth Day of November, 2005

JON W. DUDAS
*Director of the United States Patent and Trademark Office*